July 11, 1939.     G. MOODY     2,165,498
ILLUMINATED SPEEDOMETER
Filed Nov. 17, 1937
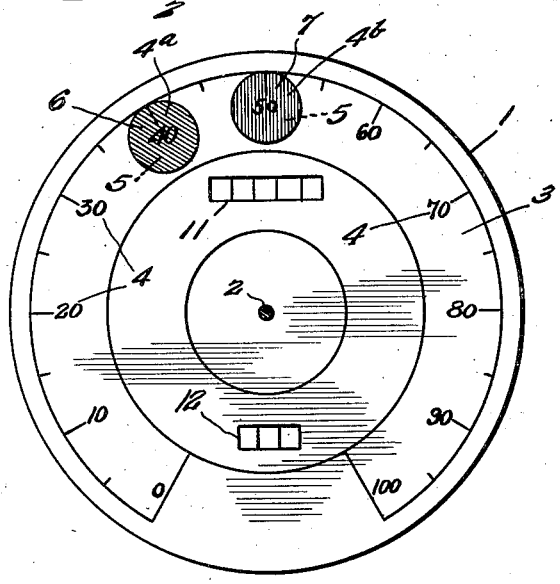
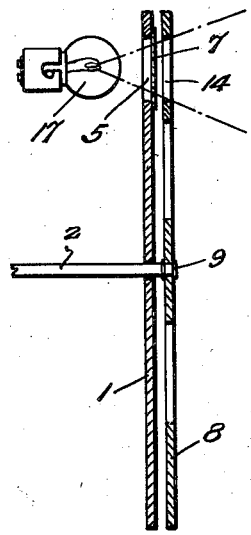
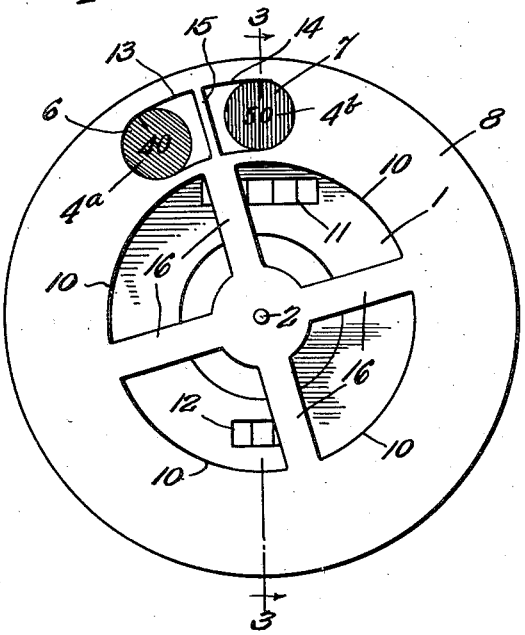
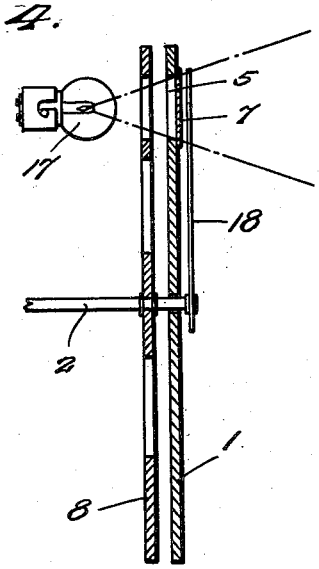
Inventor
Gordon Moody.
By Lacey & Lacey, Attorneys Patented July 11, 1939

2,165,498

UNITED STATES PATENT OFFICE 2,165,498

ILLUMINATED SPEEDOMETER

Gordon Moody, Amherst, Mass.

Application November 17, 1937, Serial No. 175,167

2 Claims. (Cl. 116—129)

This invention relates to a speedometer of the type used upon automobiles to indicate the speed at which the automobile is traveling. In some localities large fines and other penalties are imposed for traveling over a certain speed limit, and as it is difficult to accurately read speedometers now in use by merely glancing at them and dangerous to look at the speedometer instead of watching the road ahead when traveling at high speed and particularly so at night time, a person will often drive an automobile at a higher rate of speed than permitted without realizing the fact that the limit has been exceeded.

It is, therefore, one object of the invention to provide a speedometer with a dial and indicator of such construction that by causing illuminated portions of the dial to be displayed in prominent contrast to each other and other portions of the face of the dial, the driver of the automobile can by merely glancing towards the speedometer determine whether he is exceeding the speed limit.

Another object of the invention is to so construct the dial and the indicator that a light of one color will be displayed as a warning when the speed is approaching the limit allowed by law and another light of contrasting color displayed together with the first light when traveling at the legal speed, the first light being concealed and the second displayed when the speed exceeds the legal speed limit. It will thus be seen that by merely glancing towards the speedometer the driver of the automobile can tell without closely inspecting the dial whether or not the automobile is traveling within the speed limit or has exceeded the same and reduce the speed if necessary.

The invention is illustrated in the accompanying drawing, wherein:

Figure 1 is a view looking at the face of the dial with the indicator removed and the shaft carrying the indicator shown in section, Figure 2 is a view similar to Figure 1 but showing the indicator in place and in the position for indicating that the vehicle is traveling at the legal rate of speed, Figure 3 is a sectional view taken through the dial and indicator along the line 3—3 of Figure 2 with a light bulb shown in place back of the dial, and Figure 4 is a view similar to Figure 3 of a modified construction.

The improved dial, which is indicated in general by the numeral 1, is intended to take the place of a conventional dial provided as part of a speedometer which will be equipped with the usual mechanism including a shaft 2 which is rotatably mounted and journaled through the center of the dial. The usual speed markings are printed or otherwise provided upon the outer face of the dial in a path extending circumferentially thereof, as shown at 3 in Figure 1, and increases in speed of ten miles per hour are marked, as shown at 4. The dial is intended to serve as a warning when the automobile is running at the speed limit of a certain locality or at a greater speed than permitted, and for purposes of illustration it has been assumed that the speed limit is forty-five miles per hour. Therefore, a special marking has been provided for the dial marking indicating forty miles an hour and another special marking for the dial marking indicating fifty miles an hour. In other words, a dial marking indicating a speed five miles slower than permitted by law and a dial marking indicating a speed five miles faster than permitted have been specially marked in accordance with this invention. Referring to Figures 1 and 3, it will be seen that openings 5 have been formed through the dial 1 at the forty mile speed marking and also at the fifty mile speed marking, these openings being covered by transparent disks 6 and 7 upon which the speed markings 4a and 4b are printed or otherwise marked. These markings indicate forty miles per hour and fifty miles per hour respectively, and the disks are formed of contrasting colors so that they can be readily distinguished from each other. The disk 6 is preferably of green material and the disk 7 colored red as these colors are commonly used upon traffic signs for indicating "safety" and "danger", but it is to be understood that any contrasting colors desired may be used. Glass, Celluloid, colored paper or any desired material may be used for the disks and these disks are cemented or otherwise secured against the outer face of the dial or disk 1 in covering relation to the openings 5.

Instead of applying a pointer to the outer end of the shaft 2 and fixing the pointer to the shaft so that it swings with the shaft and its free end follows the dial marking upon the dial 1, there has been provided a shield 8 formed of opaque sheet material. This disk is secured upon the outer end of the shaft 2, as shown at 9, so that it turns with the shaft and is formed with cut-outs 10 in order that the mileage registers 11 and 12 may be seen and read. Openings 13 and 14 which are set off from each other by a narrow strip 15 of the material from which the shield is formed are provided in the marginal portion of the shield and extend circumferentially thereof, as shown in Figure 2, with the strip 15 extending radially of the shield. This strip is preferably in alinement with one of the spokes 16 of the shield and takes the place of a pointer as it is so located that, when the shield is turned with the shaft 2, this strip or pointer 15 will move along the dial marking 3 from one speed indicator 4 to another.

When a speedometer equipped with the improved dial is in use, it is mounted in the usual manner through the instrument board and when a switch is turned on a bulb 17 back of the dial will be lighted and light from this bulb will pass outwardly through the openings 5 and the transparent disks 6 and 7. When the automobile is at a standstill, the shield will be in such a position that the strip or pointer 15 will be at the zero end of the dial markings and the transparent disks 6 and 7 covered by the shield and hidden from view. When the automobile is in motion and the shaft 2 is turned in accordance with the speed at which the automobile is traveling, the shield 8 turns with the shaft 2 and the pointer or strip 15 moves from one speed marking to another until it approaches the green disk 6 having the numeral 40 thereon. The opening 14 will gradually move into position to display the green disk and when the driver of the automobile glances towards the speedometer and sees the green light he knows that the automobile is traveling at approximately forty miles an hour. In case the strip 15 extends diametrically across the green disk, the driver will know that he is traveling exactly forty miles an hour. As the speed of the automobile increases, the strip 15 will move towards the disk 7 which is red and marked to indicate fifty miles per hour. During movement of the strip 15 past the forty mile mark, the opening 14 will move towards the red disk 7 and the red disk will be gradually exposed until it is fully exposed at which time the strip 15 will be at the gage mark indicating forty-five miles an hour and the green disk 6 will be fully exposed through the opening 13. This is clearly shown in Figure 2, and referring to this figure, it will be seen that both of the disks 6 and 7 are fully disclosed to view. Therefore, when the driver of the automobile glances towards the speedometer, he will see both of the disks 6 and 7 fully exposed and as one is green and the other red it will indicate that he is traveling forty-five miles an hour. If the green disk is fully exposed to view and only a portion of the red disk, this will indicate that the automobile is traveling between forty and forty-five miles an hour. Further movement of the strip 15 towards the mark indicating fifty miles an hour will cause the green disk to be gradually covered and concealed from view and when the automobile is traveling fifty miles an hour the green disk 6 will be fully covered and concealed but the red disk will be fully exposed with the strip 15 extending diametrically across it. When the driver of the automobile glances towards the speedometer and notices that the green disk is only partially displayed, he will know that the speed is above forty-five miles an hour and if the green disk is totally concealed and the strip 15 extends across the red disk he will know that he going fifty miles an hour. Therefore, he will be warned that he is exceeding the speed limit without taking time to carefully read the speedometer and will reduce the speed until both the red and the green disks are in view or only the green disk. It will thus be seen that likelihood of the driver of an automobile exceeding the speed limit unintentionally will be reduced to a minimum and also that since it is not necessary to closely inspect the speedometer the motorist can read the speedometer by merely glancing at it without turning his head and accidents caused by a motorist looking at the speedometer instead of the road ahead will be prevented.

In Figure 4, there has been illustrated a modified construction. In this embodiment of the invention the shield 8 is mounted upon the shaft 2 back of the dial 1 instead of in front of the dial and when the shield is in a position corresponding to that of Figure 2 the light from the bulb 17 will shine through the openings 13 and 14 and then through the colored disks. A pointer 18 is fixed upon the front end of the shaft radially thereof and has swinging movement imparted to it as the shaft is turned so that the pointer will move from one speed marking of the dial to another as the speed of the automobile is increased or reduced. In this embodiment of the invention the appearance of the dial is the same as dials of a conventional construction except for the fact that the transparent disks 6 and 7 are applied to it and are illuminated when the speed of the automobile is within a range of from five miles below the legal speed limit to a speed of five miles above the legal speed limit.

Having thus described the invention, what is claimed as new is:

1. In a speedometer, a dial provided with gage markings in an arcuate path, said dial having openings in the path in spaced relation to each other circumferentially of the dial, covers of light penetrable material applied to the dial in covering relation to the openings and bearing gage markings, the said covers being of prominently contrasting colors and one having its gage marking indicating a speed below a predetermined speed indicated by a gage marking midway the openings and the other having its gage marking indicating a speed above the predetermined speed, a shaft journaled through said dial, and a shield for the dial carried by and moving with the shaft and having sight openings closely spaced from each other to provide a narrow strip constituting an indicator, the sight openings having movement with the shield along the path of speed markings and adapted to successively and collectively display the speed markings upon said covers.

2. In a speedometer, a dial, a shaft journaled through the dial centrally thereof, said dial having speed markings provided thereon spaced from each other circumferentially of an arcuate path adjacent to the periphery of the dial, openings being formed through the dial in the position of certain of the speed markings at opposite sides of a marking indicating a predetermined speed, disks of light penetrable material carried by the dial in covering relation to the openings and one indicating a speed less than the predetermined speed and the other disk indicating a speed higher than the said predetermined speed, a bulb for projecting light through said disks, and a shield for said dial fixedly carried by said shaft and turning therewith, the shield being formed with openings for displaying speed markings closely spaced from each other circumferentially of the shield to provide a strip between the openings constituting an indicator extending radially of the dial and the shield between the markings in position to move from one speed marking to another as the shield turns with the shaft, said indicator being in position to extend across the speed marking indicating the said predetermined speed when the openings of the shield are in position to fully display both of said disks.

GORDON MOODY.